UNITED STATES PATENT OFFICE 2,574,379

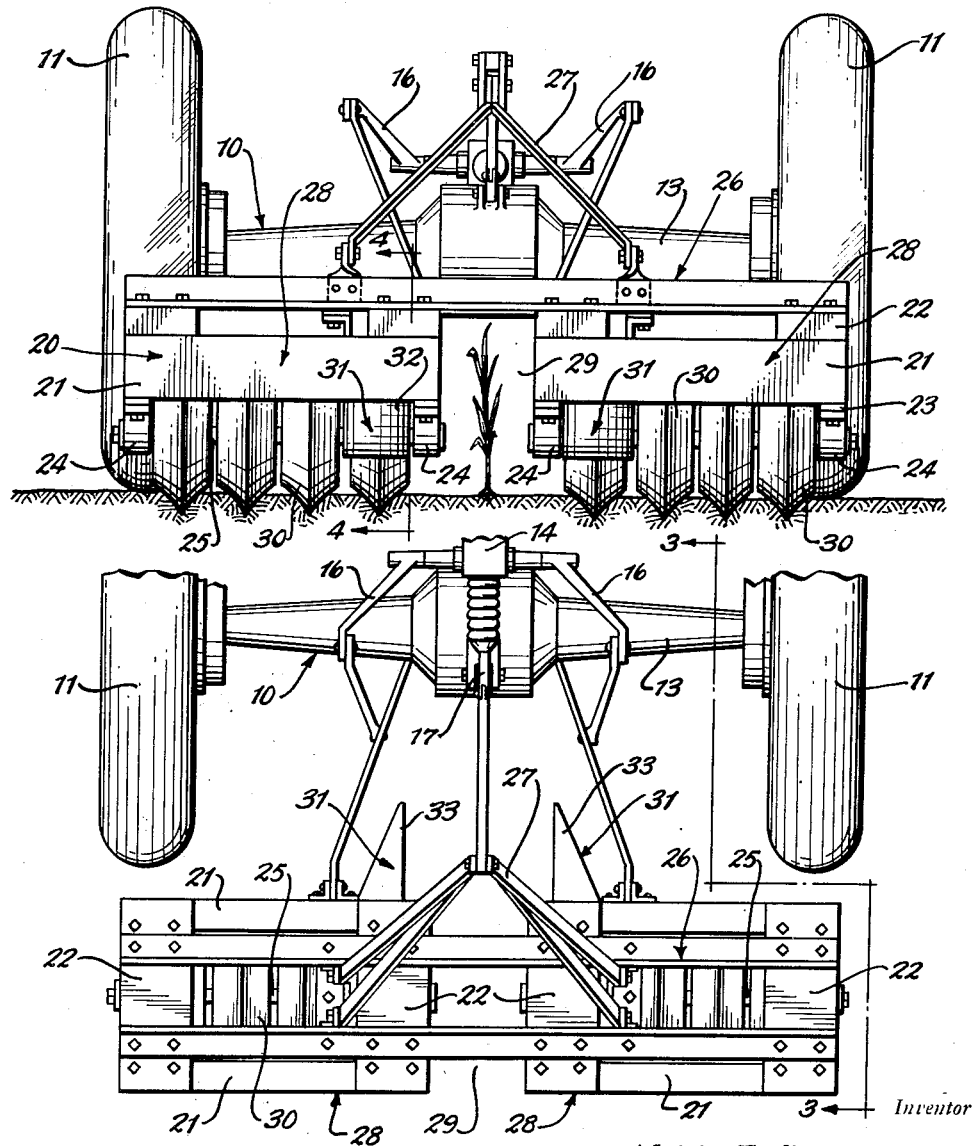

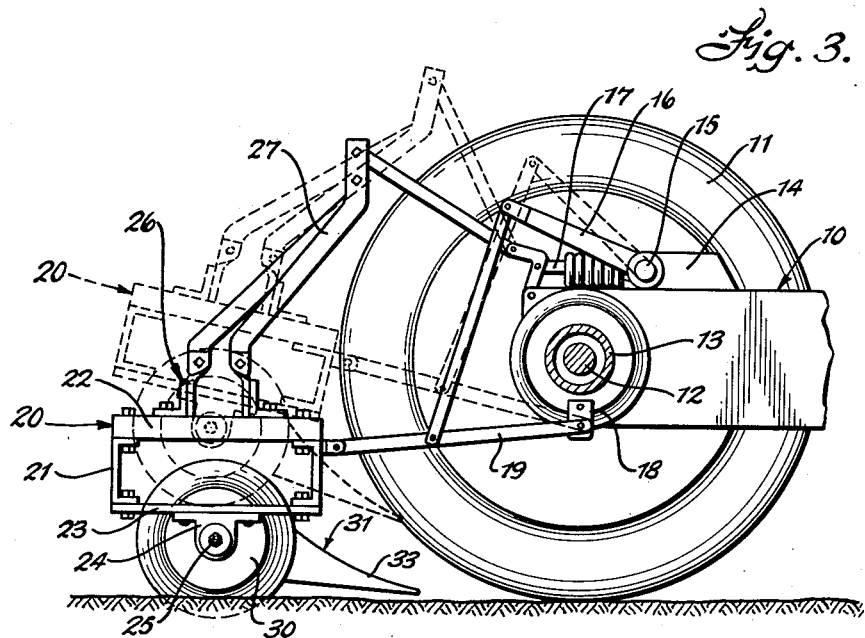
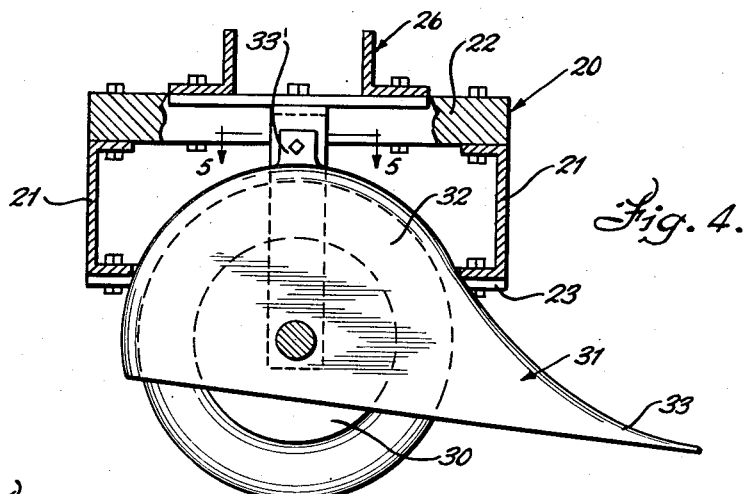
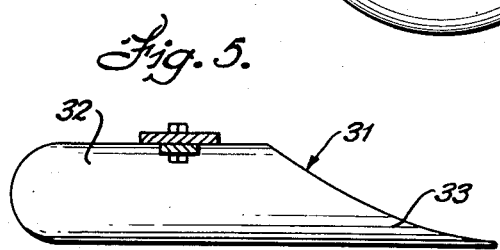

ROLLING ROW CROP CULTIVATOR

Noble E. Cummings, Goodlettsville, Tenn.

Application February 20, 1946, Serial No. 648,893

1 Claim. (Cl. 55—77)

This invention relates to a cultivator attachment for a farm tractor and has for its primary object to facilitate the cultivation of row crops.

Another object is to destroy weeds and compact the earth on opposite sides of a crop row in order to preserve its capillarity.

Still another object to culivate the surface soil between crop rows.

A further object is to regulate the depth to which the cultivator wheels enter the ground and the pressure exerted by them on the surface being cultivated, and also to facilitate the turning of the device at the end of a crop row.

A still further object is to protect the plants being cultivated from injury through contact with the cultivator wheels.

The above and other objects may be attained by employing this invention which embodies among its features a cultivator attachment adapted to be connected to the rear end of a tractor having a power lift, means connecting the cultivator with the power lift by which the pressure of the cultivator wheels on the earth being cultivated may be governed, and cultivator wheels so constructed not only as to destroy weeds but also to compact the earth over which the cultivator travels.

Other features include arranging the cultivator wheels in spaced groups so that the cultivator may straddle a row of growing crops, and leaf lifters carried by adjacent ends of the groups of wheels to lift the leaves of the growing crops from the earth prior to the passage of the cultivator wheels over the surface thereof.

In the drawings,

Figure 1 is a rear end view of a cultivator embodying the features of this invention and showing the same connected to a tractor having a power lift, Figure 2 is a fragmentary top plan view of Figure 1, Figure 3 is a sectional view taken substantially along the line 3—3 of Figure 2 showing in dotted lines the cultivator in elevated position, Figure 4 is an enlarged transverse sectional view through the cultivator illustrating in detail one of the leaf lifters, and Figure 5 is a horizontal sectional view taken substantially along the line 5—5 of Figure 4.

Referring to the drawings a tractor designated generally 10 is equipped with the usual traction wheels 11 mounted at opposite ends of an axle 12 which is contained within a transversely extending housing 13. The tractor 10 is provided with a conventional power lift 14. To the opposite ends of the drive shaft 15 thereof are attached lift arms 16. The power lift 14 is also provided with a longitudinally moving plunger 17 all in the conventional manner.

Pivoted to suitable brackets 18 secured to the underside of the housing 13 on opposite sides of the longitudinal axis of the tractor are links 19 the opposite ends of which are attached to the frame of the cultivator attachment designated generally 20. This cultivator attachment comprises a pair of spaced parallel side bars 21 preferably of channel construction and having attached to their upper and lower flanges cross bars 22 and 23 respectively. Depending from the undersides of the cross bars 23 are aligned journal bearings 24 in which the shafts 25 of the cultivator wheels are rotatably mounted.

The upper cross bars 22 of the frame 20 are connected to the tractor lift frame designated generally 26 which as shown is connected through suitable conventional linkage 27 to the plunger 17. It will then be seen that by manipulation of the power lift 14 the levers 16 and the linkage 27 will function to elevate the cultivator frame 20 as suggested by the dotted lines in Figure 3.

As illustrated in Figure 1 the cultivator frame 20 is divided into two separate parts each of which is designated generally 28 to form a space 29 between adjacent ends thereof so that the cultivator will straddle a row of growing crops so as to permit the treatment of the earth on opposite sides thereof. Mounted on each shaft 25 is a group of cultivator wheels 30 each of which comprises a circular body of substantial width having a V-shaped periphery for contact with the earth.

In cultivating tobacco and like leafy plants where it is desired to preserve the leaves from injury I provide at the adjacent end of each group of wheels 30 a leaf lifter designated generally 31. Each leaf lifter comprises an arcuate body 32 carrying a bracket 33' for attachment to the frame 20, from the forward edge of which projects a shoe 33 which is adapted to ride along with the frame in advance thereof but close to the surface of the ground so that when a leaf is encountered it will be engaged by the pointed end of the shoe 33 and lifted over the guard portion 32 which as illustrated in Figure 4 partially encloses the adjacent cultivator wheel 30. It will thus be seen that the leaves of the plants being cultivated may be lifted in advance of the cultivator wheels and held in an upright position during the passage of the cultivator in order to avoid injury thereto.

In operation the attachment is fastened to a tractor having a power lift as suggested in Figure 3 and the tractor and its cultivator attachment may then be driven through a field in such a manner as to straddle the rows of crops as suggested in Figure 1. By adjusting the vertical position of the frame 20 by pivotal movement of the links 19 about their forward ends through the medium of the power lift 14 it is obvious that the wheels 30 may be made to bear upon the earth being traversed with different degrees of pressure. In this way the packing of the earth is under the direct control of the operator. Also in turning corners or returning along another row it is obvious that the tractor may be turned around and re-directed as desired without disturbing the surface being traversed by lifting the frame 20 so that the wheels 30 will clear the ground.

Obviously the attachment may be employed in connection with horse-drawn cultivators to which the units 28 may be attached in proper spaced relation to operate on opposite sides of a row of crops. Should it be desired, the device may be used to cultivate two or more rows simultaneously by adding more units in proper spaced relation within the limits of the cultivator on which the units are mounted.

While in the foregoing there has been shown and described the preferred embodiment of this invention it is to be understood that minor changes in the details of construction, combination and arrangement of parts may be resorted to without departing from the spirit and scope of the invention as claimed.

Having thus described the invention, what is claimed as new is:

An attachment for compacting soil adjacent rows of plants in combination with a farm tractor having a power lift; said attachment comprising a wheel supporting frame, links pivoted to the rear axle of the tractor and to the front edge of the frame to support the frame for movement through a vertical arc, spaced groups of earth compacting wheels mounted on the frame to rotate about a horizontal axis which lies parallel to the axle of the tractor, a pair of combined wheel guards and plant lifters carried in spaced relation by the frame between the groups of compacting wheels, each of said lifters consisting of a disk cut away at its bottom to afford ground clearance and having an integral shoe projecting forwardly from the bottom thereof, the bottom edge of the shoe constituting a continuation of the bottom edge of the disk, the forward end of the shoe terminating in a point and having a concaved upper edge smoothly merging at its rear end with the upper edge of the disk, and means coupled to the power lift and to the links for moving the frame in unison with the power lift whereby the pressure with which the earth compacting wheels engage the ground may be regulated by the power lift.

NOBLE E. CUMMINGS.

REFERENCES CITED

The following references are of record in the file of this patent:

UNITED STATES PATENTS

| Number | Name | Date |
| --- | --- | --- |
| 794,696 | Barditzky | July 11, 1905 |
| 893,767 | Volkmor | July 21, 1908 |
| 1,325,770 | Woodin et al. | Dec. 23, 1919 |
| 1,420,351 | Wagner | June 20, 1922 |
| 2,000,260 | Snyder | May 7, 1935 |
| 2,320,624 | Love | June 1, 1943 |
| 2,361,605 | Cross | Oct. 31, 1944 |

FOREIGN PATENTS

| Number | Country | Date |
| --- | --- | --- |
| 233,570 | Germany | Apr. 13, 1911 |
| 549,114 | Great Britain | Nov. 6, 1942 |
| 554,033 | Great Britain | June 16, 1943 |